(12) United States Patent
Chen et al.

(10) Patent No.: US 7,755,887 B2
(45) Date of Patent: Jul. 13, 2010

(54) MOUNTING DEVICE FOR DISK DRIVE

(75) Inventors: Yun-Lung Chen, Taipei Hsien (TW); Gang Su, Shenzhen (CN); Wan-Cheng Lin, Taipei Hsien (TW); Fa-Ming Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 76 days.

(21) Appl. No.: 12/107,782

(22) Filed: Apr. 23, 2008

(65) Prior Publication Data
US 2009/0161308 A1 Jun. 25, 2009

(30) Foreign Application Priority Data
Dec. 25, 2007 (CN) .................. 2007 2 0201770

(51) Int. Cl.
*H05K 7/14* (2006.01)
(52) U.S. Cl. .................. 361/679.33; 361/679.37; 361/727; 312/223.2
(58) Field of Classification Search ......... 361/679.02, 361/679.33, 679.35, 679.37, 679.38, 679.39, 361/727; 312/223.2
See application file for complete search history.

(56) References Cited

U.S. PATENT DOCUMENTS

| | | | | |
|---|---|---|---|---|
| 4,896,777 A | * | 1/1990 | Lewis | 211/41.17 |
| 5,682,291 A | * | 10/1997 | Jeffries et al. | 361/679.58 |
| 5,978,212 A | * | 11/1999 | Boulay et al. | 361/679.31 |
| 6,456,501 B1 | * | 9/2002 | Rubenstein et al. | 361/759 |

* cited by examiner

*Primary Examiner*—Jayprakash N Gandhi
*Assistant Examiner*—Ingrid Wright
(74) *Attorney, Agent, or Firm*—Frank R. Niranjan

(57) ABSTRACT

A mounting device for a disk drive includes a bracket for receiving the disk drive, and a securing member for mounting the disk drive in the bracket. The bracket includes a pair of side panels for receiving the disk drive therebetween. A cutout is defined in each side panel in a front portion thereof. The securing member includes a handle and a pair of cantilevers extending from opposite ends of the handle. The handle includes a base body and a pair of arms extending from opposite ends of the base body to connect the pair of cantilevers. Each arm includes a first bent portion protruding outwardly from the base body, and a second bent portion protruding inwardly from the first bent portion. A resilient protrusion is formed on the second bent portion for inserting in the cutout.

8 Claims, 4 Drawing Sheets

MOUNTING DEVICE FOR DISK DRIVE

BACKGROUND

1. Technical Field

The present invention relates to a mounting device, and more particularly to a mounting device for securely and simply retaining a disk drive in a computer enclosure.

2. Description of Related Art

Usually, at least one disk drive is secured in a computer for data storage use. Disk drives are conventionally secured to the computer by a plurality of screws. The screws are small, and when securing or dismounting the disk drive, the screws are easily dropped into the computer enclosure, which may result in damage.

Subsequently, some mounting devices for mounting the disk drive without screws are developed. A typical screwless disk drive mounting structure includes a casing, the casing having positioning units disposed in two opposite sidewalls thereof at different elevations, a plurality of carrier plates respectively hooked in the positioning units and adapted for holding disk drives in the casing at different elevations, a plurality of hold-down frames respectively pivoted to the positioning units at one sidewall of the casing and adapted for holding down the corresponding disk drives on the carrier plates, and a plurality of locking handles respectively pivoted to the positioning units at one sidewall of the casing and adapted for locking the hold-down frames and the disk drives. However, the above described-structure has at least two disadvantages. First, the mounting structure has many components, each component has a complicated structure, and thus the mounting structure is difficult to manufacture. Second, a large space is needed for rotating out the locking handle of the mounting structure.

What is needed, therefore, is to provide a mounting device for disk drives, having a simple structure, and is easy to use.

SUMMARY

A mounting device for a disk drive includes a bracket for receiving the disk drive, and a securing member for mounting the disk drive in the bracket. The bracket includes a pair of side panels for receiving the disk drive therebetween. A cutout is defined in each side panel in a front portion thereof. The securing member includes a handle and a pair of cantilevers extending from opposite ends of the handle. The handle includes a base body and a pair of arms extending from opposite ends of the base body to connect the pair of cantilevers. Each arm includes a first bent portion protruding outwardly from the base body, and a second bent portion protruding inwardly from the first bent portion. A resilient protrusion is formed on the second bent portion for inserting in the cutout.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
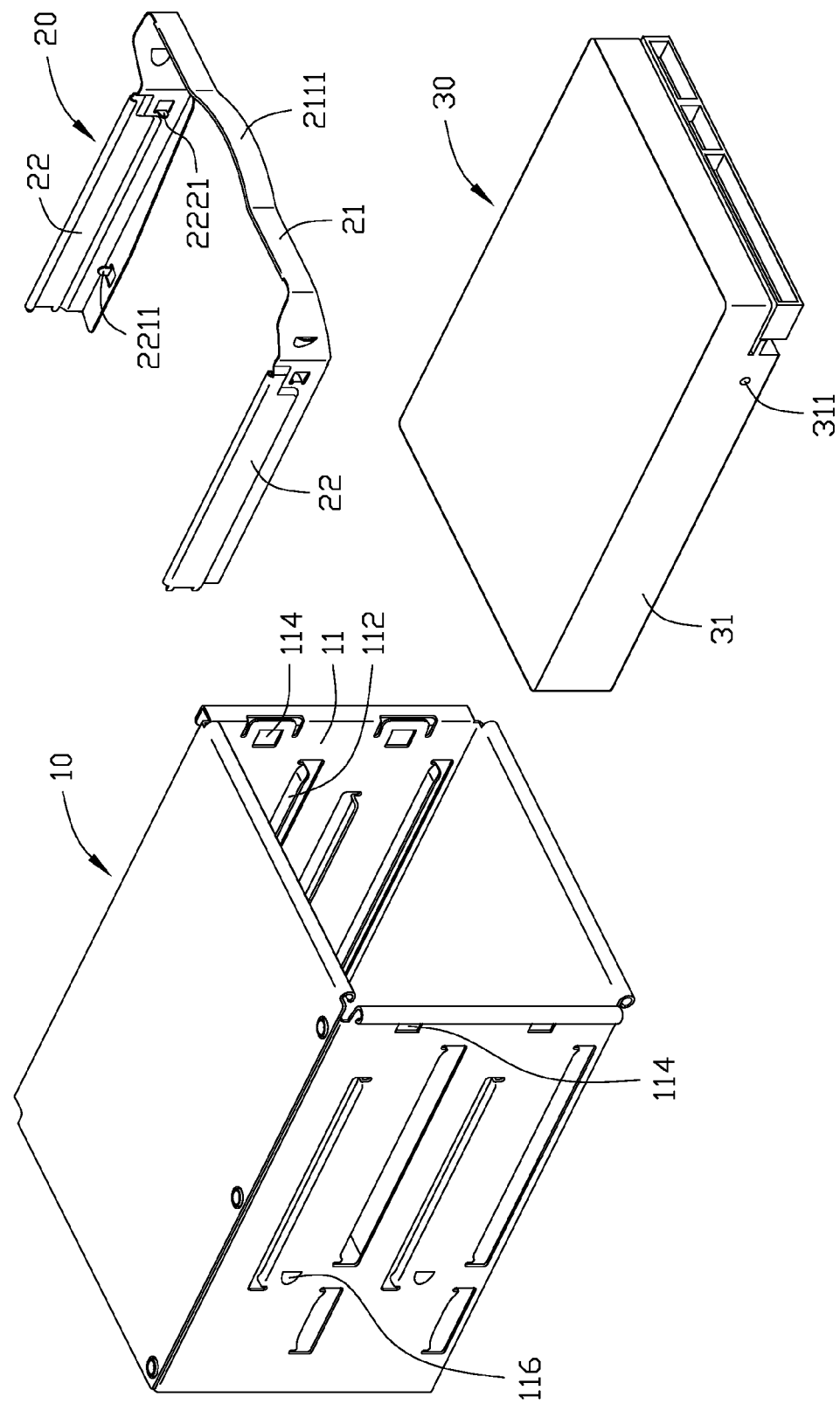
FIG. 1 is an exploded, isometric view of a mounting device for a disk drive according to an exemplary embodiment of the present invention, the mounting device including a bracket and a securing member.

Referring to FIG. 1, a mounting device for a disk drive 30 of the exemplary embodiment of the present invention includes a bracket 10, and a securing member 20 attached to the bracket 10 for securing the disk drive 30 in the bracket 10.

The bracket 10 has two parallel side panels 11. A supporting portion 112 extends from the inner surface of each side panel 11. A cutout 114 is defined in the front portion of each side panel 11. Each side panel 11 is punched towards the inner surface of the bracket 10 to form a block 116 at the rear portion thereof.

Figure 2:
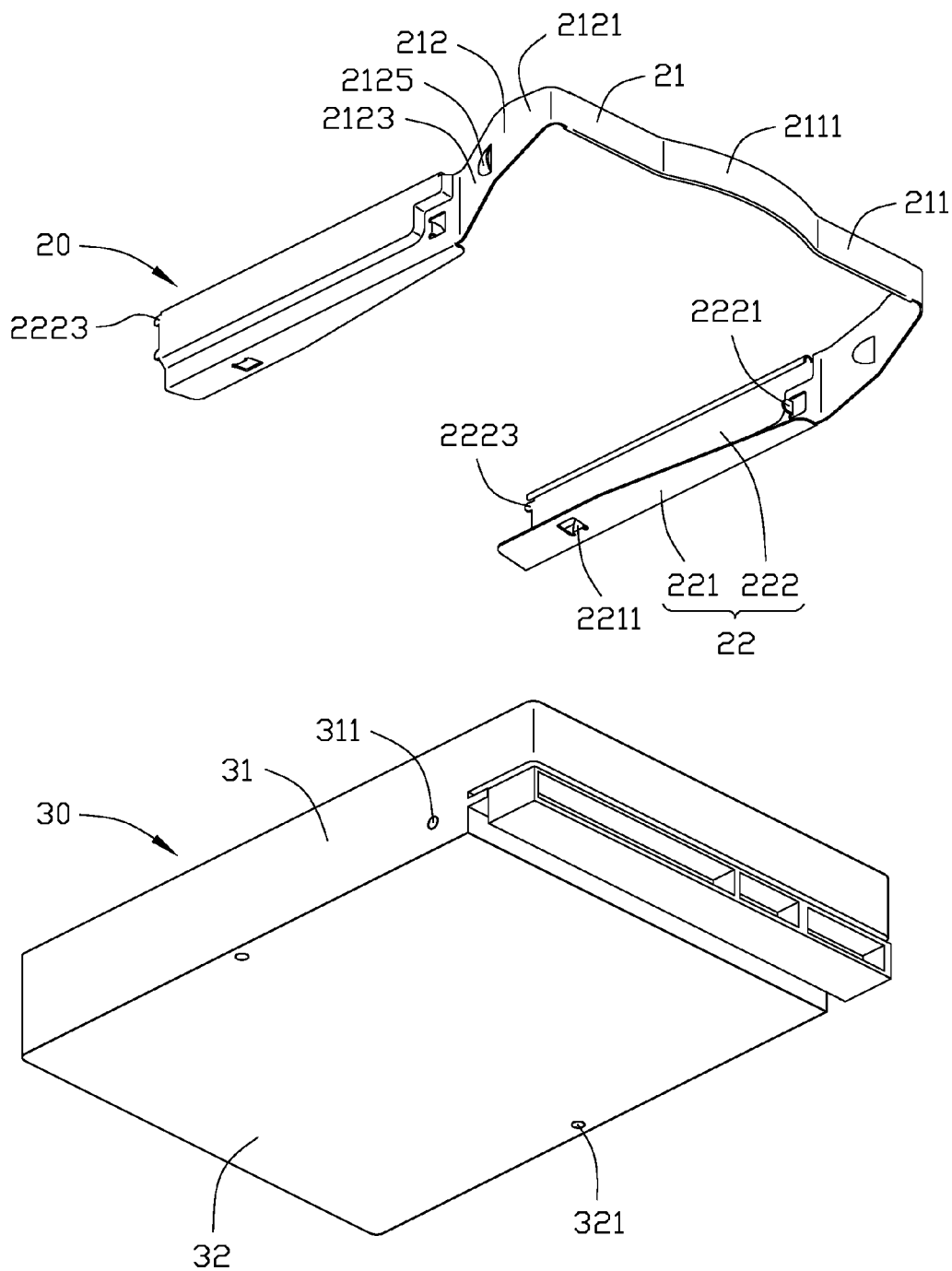
FIG. 2 is an exploded, isometric view of the securing member and the disk drive of FIG. 1.

Referring also to FIG. 2, the disk drive 30 includes a bottom 32 and a pair of sidewalls 31. A pair of first mounting holes 321 is defined in the bottom 32 adjacent opposite edges of the bottom 32 respectively. A second mounting hole 311 is defined in each sidewall 31.

The securing member 20 includes a handle 21, and a pair of cantilevers 22 extending from opposite ends of the handle 21 respectively. The handle 21 includes a base body 211 and two arms 212 extending from opposite ends of the base body 211 respectively. An arc-shaped operating portion 2111 is formed in the middle of the base body 211. Each arm 212 includes a first bent portion 2121 extending outwardly from the base body 211, and a second bent portion 2123 extending inwardly from the first bent portion 2121. An elastic protrusion 2125 is formed on the second bent portion 2123 for engaging with the cutout 114 of the bracket 10. When the operating portion 2111 of the handle 21 is pulled, the arms 212 extend forward with the second bent portions 2123 deflected inward. Each cantilever 22 includes a bottom plate 221 and a side plate 222 connecting the second bent portion 2123. A first tab 2211 is formed on each bottom plate 221 to insert in the first mounting hole 321 of the bottom 32 of the disk drive 30. A second tab 2221 is formed on each side plate 222 to insert in the second mounting hole 311 of the sidewall 31 of the disk drive 30. The extending directions of the first tab 2221 and the second tab 2211 are perpendicular to each other. A pair of tongues 2223 extends from a free end of each side plate 222.

Figure 3:
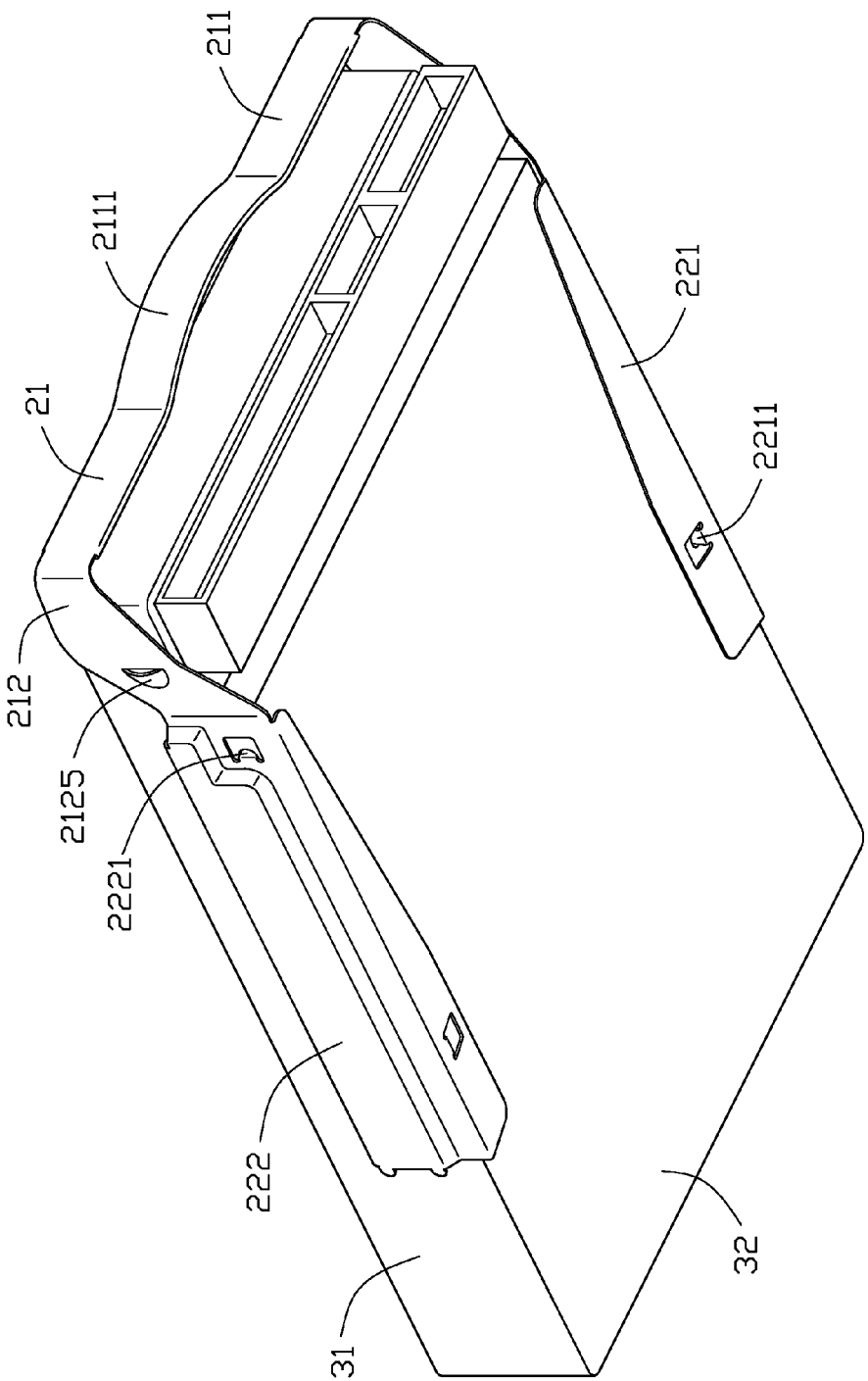
FIG. 3 is an assembled view of the securing member and the disk drive of FIG. 1.

Referring also to FIG. 3, when assembling the securing member 20 to the disk drive 30, the side plate 222 of one cantilever 22 of the securing member 20 is deformed outwardly. The first tab 2211 of the bottom plate 221 of the cantilever 22 inserts into the first mounting hole 321 of the bottom 32 of the disk drive 30. Then the side plate 222 of the cantilever 22 is released. The side plate 222 rebounds and the second tab 2221 of the side plate 222 inserts into the second mounting hole 311 of the sidewall 31 of the disk drive 30. Also, another cantilever 22 engages with the disk drive 30 via the same manner as described above. So the securing member 20 is mounted on the disk drive 30.

Figure 4:
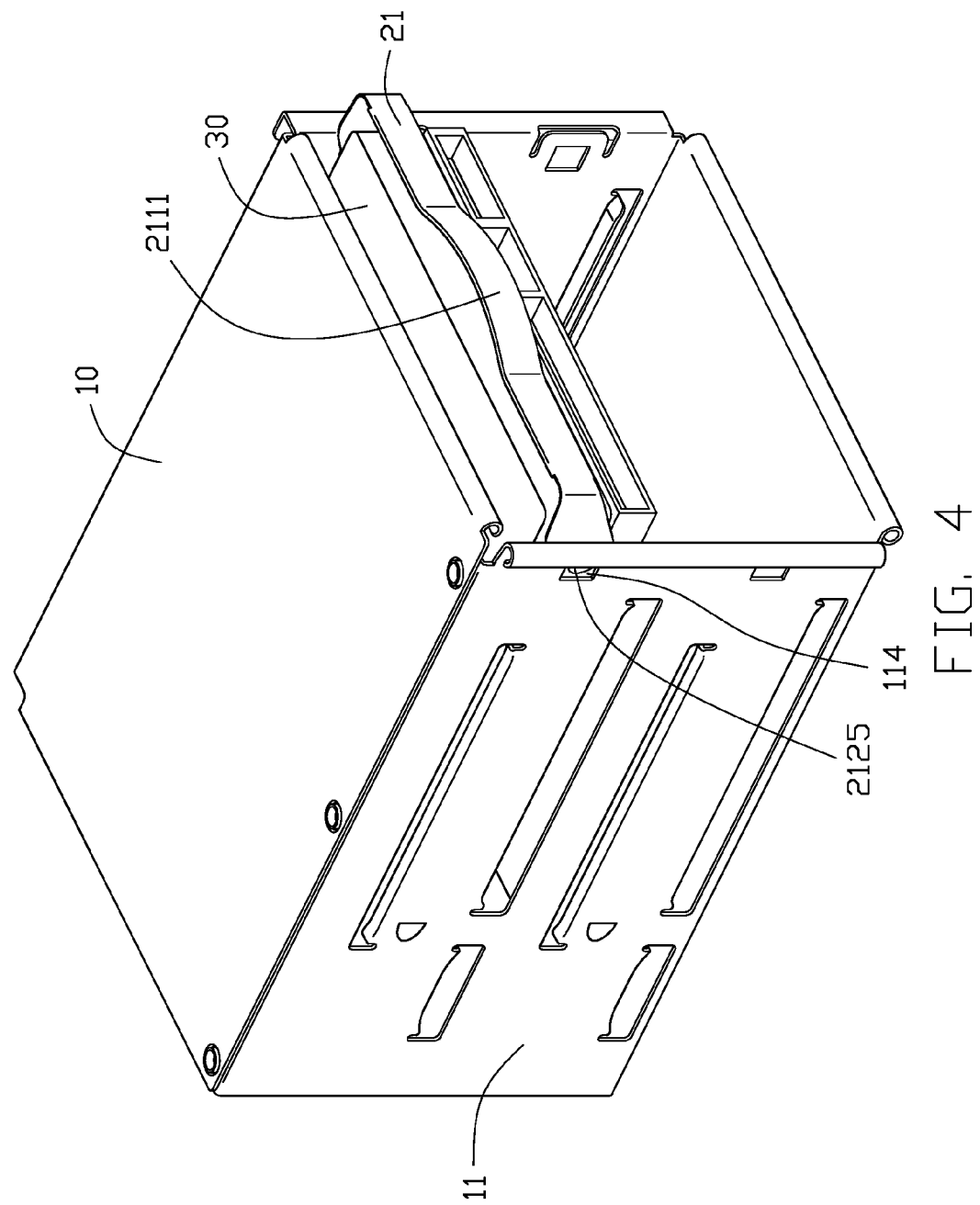
FIG. 4 is an assembled view of FIG. 1.

Referring also to FIG. 4, when mounting the disk drive 30 with the securing member 20 into the bracket 10, the disk drive 30 with the securing member 20 is aimed at the front of the bracket 10 firstly, and then moved into the bracket 10 and slid on the supporting portions 112 of the bracket 10. The protrusions 2125 of the securing member 20 resist against the inner surfaces of the side panels 11 to deform the arms 212. The disk drive 30 with the securing member 20 is moved until the blocks 116 of each side panel 11 of the bracket 10 resist against the end of the corresponding cantilever 22 and is located between two tongues 2223 of the cantilever 22. At that moment, the protrusions 2125 are in alignment with the cutouts 114 of the side panels 11. The arms 212 rebound to insert the protrusions 2125 into the cutouts 114. Thereby the disk drive 30 is mounted in the bracket 10.

When disassembling the disk drive 30 from the bracket 10, the operating portion 2111 of the handle 21 of the securing member 20 is pulled outwardly to deflect the second bent portions 2123 of the arms 212 toward each other. The protrusion 2125 of the second bent portion 2123 of each arm 212 disengages from the corresponding cutout 114 of the side panel 11. The operating portion 2111 is further pulled outwardly to disengage the disk drive 30 from the bracket 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for a disk drive, the mounting device comprising:
    a bracket for receiving the disk drive, the bracket comprising a pair of side panels for receiving the disk drive therebetween, a cutout defined in each side panel in a front portion thereof; and
    a securing member for mounting the disk drive in the bracket, the securing member comprising a handle and a pair of cantilevers extending from opposite ends of the handle, the handle comprising a base body and a pair of arms extending from opposite ends of the base body to connect the pair of cantilevers, each arm comprising a first bent portion protruding outwardly from the base body, and a second bent portion protruding inwardly from the first bent portion, a resilient protrusion formed on the second bent portion for inserting in the cutout;
wherein a pair of tongues is located on a free end of each cantilever connected to the handle, a block protrudes from each side panel of the bracket for resisting the free end of the respective cantilever; and each block is engaged with and located between the tongues on each cantilever.

2. The mounting device as described in claim 1, wherein each cantilever comprises a bottom plate supporting a bottom of the disk drive, and a side plate connecting the bottom plate.

3. The mounting device as described in claim 2, wherein a pair of first mounting holes is defined in the bottom of the disk drive, and a first tab is formed on the bottom plate of each cantilever and is inserted in the first mounting hole.

4. The mounting device as described in claim 3, wherein a second mounting hole is defined in each side panel of the disk drive, and a second tab is formed on the side plate of each cantilever and is inserted in the second mounting hole.

5. The mounting device as described in claim 4, wherein an extending direction of the first tab and an extending direction of the second tab are perpendicular each other.

6. The mounting device as described in claim 1, wherein a supporting portion is formed on an inner surface of each sidewall of the bracket for supporting the disk drive.

7. The mounting device as described in claim 1, wherein an operating portion is formed in a middle of the base body.

8. A mounting device for a disk drive, the disk drive defining a pair of first mounting holes in a bottom, the mounting device comprising:
    a bracket for receiving the disk drive, the bracket comprising a pair of side panels for receiving the disk drive therebetween, a cutout defined in each side panel in a front portion thereof; and
    a securing member for mounting the disk drive in the bracket, the securing member comprising a handle and a pair of cantilevers extending from opposite ends of the handle, the handle comprising a base body and a pair of arms extending from opposite ends of the base body to connect the pair of cantilevers, each arm comprising a first bent portion protruding outwardly at an angle from the base body, and a second bent portion protruding inwardly at an angle from the first bent portion, a resilient protrusion formed from the second bent portion for insertion in the cutout, a first tab formed on each cantilever for insertion in the first mounting hole;
wherein a pair of tongues are formed on a free end of each cantilever, and a block is protruded from each side panel of the bracket for resisting the free end of the respective cantilever, and the block being engaged with and between the tongues.

* * * * *